United States Patent [19]
Marian et al.

[11] 3,730,508
[45] May 1, 1973

[54] VARIABLE OFFSET SPRING MOUNTING BLOCK FOR LOAD-BEARING VEHICLES

[76] Inventors: Daniel Marian, 3924 Cascade Drive, Youngstown, Ohio 44511; Michael Ramun, 53 Broadway St., Youngstown, Ohio 44505

[22] Filed: Mar. 19, 1971

[21] Appl. No.: 126,120

[52] U.S. Cl. ...............................................267/52
[51] Int. Cl. ..............................................F16f 1/22
[58] Field of Search.......................................267/52

[56] References Cited
UNITED STATES PATENTS 3,144,246  8/1964  Hamlet..................................267/52
3,591,163  7/1971  Anderson..............................267/52

*Primary Examiner*—James B. Marbert
*Attorney*—Peter L. Klempay

[57] ABSTRACT

A suspension arrangement in which the axis may be shifted fore or aft of the center of the spring assembly. A carrier member is mounted on the spring assembly. The carrier member mates with an axle mounting block secured to the axle. The mating surfaces of the carrier and the axle mounting members are keyed so that the axle mounting member may be shifted forward or aft to any one of several descrete positions on the carrier member.

3 Claims, 5 Drawing Figures

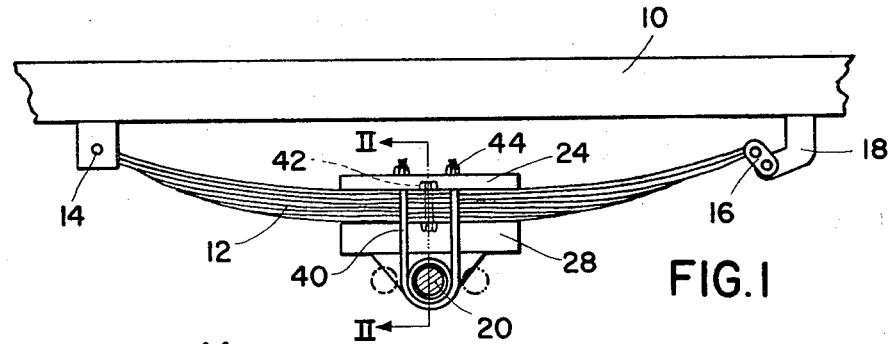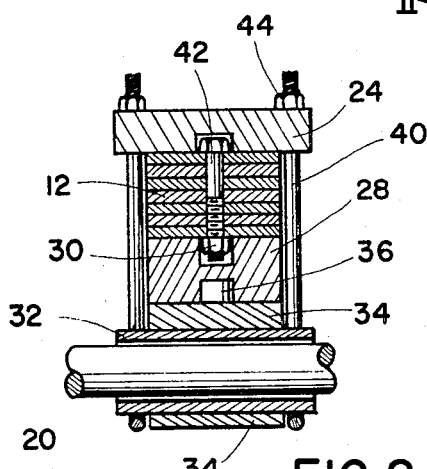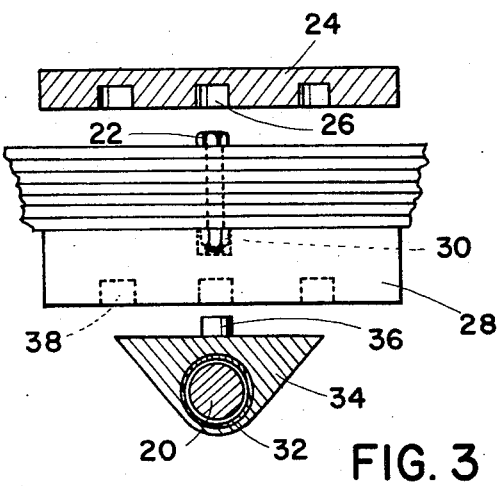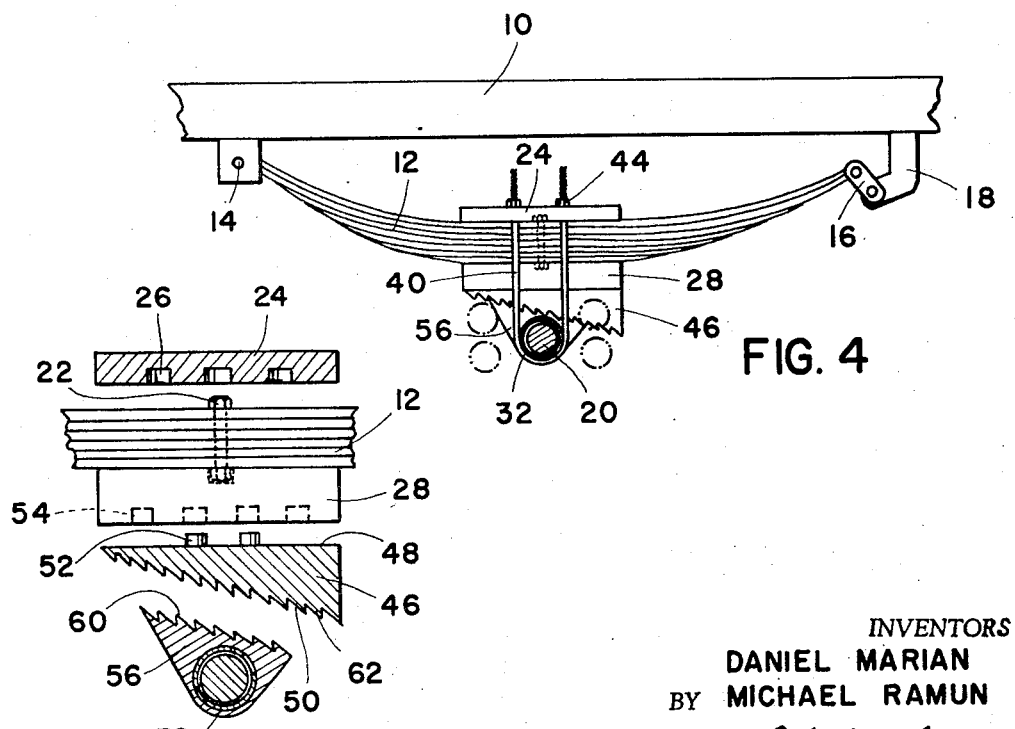

VARIABLE OFFSET SPRING MOUNTING BLOCK FOR LOAD-BEARING VEHICLES

This invention relates to a vehicle suspension arrangement and more particularly to an improved suspension arrangement for load-bearing vehicles such as trucks and trailers.

The invention has as its principle object an improved arrangement for mounting the axles of such vehicles to the leaf spring or other suspension systems whereby more efficient loading of the springs is achieved and whereby the recoil action of the springs or other suspension means is effectively applied to the axles.

Commonly, heavy load-carrying vehicle suspension systems have consisted of semi-elliptical leaf springs connected at their ends to the vehicle frame and mounting the vehicle axle in fixed relation midway between tne ends of the springs. The springs of such systems are subject at all times to a loading factor resulting from the vehicle weight and the weight of the load carried thereby. This loading factor is applied uniformly and is evenly distributed between the forward and rearward halves of the semi-eliptical springs. When the vehicle is accelerated an additional loading factor acts on the springs. This additional factor is a torque loading factor resulting from the tendency of the axle assembly to rotate in opposition to the accelerating force. This second loading factor is applied to the springs at the mounting point of the axle on the spring and tends to rotate the springs about this mounting point. Thus, when the vehicle is accelerated in the forward direction the torque loading factor tends to increase the loading on the rear half of the spring since the rotation is effective to increase the total loading on the rear half of the spring. The loading on the front half of the spring, however, is decreased since the torque loading factor is in the opposite direction and thus subtracted from the static loading factor on the front portion of the spring. As a result of this unbalanced loading of the springs, there is a reactive force which tends to oppose the rotation of the axle assembly and, thus, add to the vehicle accelerating force.

In our U.S. Pat. No. 2,788,224, SPRING SUSPENSION FOR LOAD-BEARING ROAD VEHICLES, there is shown an axle mounting arrangement which utilizes the reactive force of the suspension system to assist vehicle acceleration. The present invention constitutes an improvement over the system disclosed in the above-mentioned patent.

The present invention provides an axle mounting arrangement which applies the torque loading to the spring system in such a manner as to achieve a higher reactive force. The system of the present invention also provides for the adjustment of the axle position relative to the spring centers so that the point of torque loading can be varied, as desired, depending on the static loading factor.

The present invention is also suitable for use with other types of suspension systems such as coil springs, compressable pads, air bags, etc..

For a more complete understanding of the invention and of the objects and advantages thereof reference should be had to the following specification and the accompanying drawing wherein there is shown a preferred embodiment of the invention.

In the drawing:

FIG. 1 is a side elevational view of a first embodiment of our invention;

FIG. 2 is a transverse sectional view taken along the line II—II of FIG. 1;

FIG. 3 is an exploded view showing the relationship of the components of the embodiment of FIG. 1;

FIG. 4 is a side elevational view of a second embodiment of our invention; and

FIG. 5 is a fragmentary exploded view showing the relationship of the various components of the embodiment of FIG. 4.

The reference numeral 10 designates the frame of a truck or other vehicle. The frame 10 is provided with conventional multiple leaf springs 12 secured at one end by brackets 14 and at their opposite ends by links 16 and brackets 18. It will be understood that while the invention is described with particular reference to coil spring arrangements, the invention is not limited to such arrangements but may be readily adapted to other types of suspension systems. The springs 12 serve to support the frame 10 on axles 20. As will be understood by those skilled in the art the size and number of leaves of the spring 12 is determined by tne anticipated load to be carried on the axle and desired suspension characteristics of the vehicle. The individual leaves of the spring 12 are normally held together at their midpoint by one or more bolts 22.

The novel arrangement for securing the axles 20 to the springs 12 shown in more detail in FIGS. 2 and 3. As will be seen from these Figures an upper plate 24 which is either slotted along its center or provided with a number of recesses 26 to provide clearance for the upper end of the bolts 22 is positioned on top of the spring 12. A spacer block 28 is positioned below the spring 12 and is also provided with a recess 30 to provide clearance for the lower end of the bolts 22. Secured to the axle housing 32 are support blocks 34 which are contoured on their lower surfaces to conform to the external shape of the axle housing 32. The top surface of the supporting block 34 is provided with an upwardly projecting pin or lug 36. The lower surface of the spacer block 28 is provided with a plurality of recesses 38 for mating with the lug 36 of a support block 34. A U bolt 40 is positioned on either side of the spring 12 with the closed end of the U bolt surrounding the axle housing 32 and with the upper ends of the bolt passing through holes 42 in the top plate 24. Nuts 44 are threaded onto the U bolts to tightly clamp the assembly.

When it is desired to shift the axle forwardly or rearwardly relative to the midpoint of the springs 12 to decrease or increase the torque loading on the forward half of the spring assembly, it is merely necessary to loosen the nuts 44 of the U bolts 40 so that the supporting plate 44 may be moved forwardly or rearwardly relative to the spacer block 28. The upper plate 24 may either be moved forwardly or rearwardly along with the support block 34 or, as an alternative, the holes 42 which receive the upper ends of the U bolt 40 may be slotted to permit this forward and rearward movement. Since the spacer block 28 is prevented from moving forwardly or rearwardly by the lower end of the bolts 22 in the recess 30 and since the support block 34 is retained by the lug 36 in one of the recsses 38 when the U bolts 40 are tightened, the arrangement provides a rigid assembly which does not permit undesirable shifting of the axle.

The spacer block 28 and a support block 34 may be of lesser width than the separation between the two U bolts 40 or, if desired, vertically extending grooves may be provided on the sides of these blocks 28 and 34 to receive the U bolts.

A second embodiment of our invention which permits both vertical and horizontal adjustment of the axle position is shown in FIGS. 4 and 5. In this embodiment there is again provided a top plate 24 and a spacer block 28. Below the spacer block 28 there is provided a wedge shaped block 46 having a horizontal top surface 48 and an inclined lower surface 50. The top surface 48 of the adjustment block 46 is provided with one or more upwardly projecting lugs 52 which may be received in any of a plurality of recesses 54 on the lower surface of the spacer block 28. The axle support block 56 of this embodiment has an inclined upper surface 58 extending parallel to the lower inclined surface 50 of the adjustment block 46. The upper surface 58 of the axle support block 56 is provided with upwardly projecting lugs 60 which is received in any one of a plurality of notches 62 extending upwardly from the lower surface 50 of the adjustment block 46. As in the previously described embodiment, the U bolts 40 surrounding the axle housing 32 and extending upwardly through the top plate 24 are provided for clamping the assembly together.

It can be seen that with this embodiment when the adjustment block 46 and axle support block 56 are moved as a single unit relative to the spacer block 28 forward and rearward positioning of the axle is obtained. Vertical adjustment of the axle is obtained by moving the adjustment block 46 forwardly or rearwardly while maintaining the spacer block 28 and the axle support block 56 in their same relative positions. Obviously, the two methods of adjustment may be combined to produce both vertical and horizontal shifting of the axle position.

It will be understood that while only the best known embodiments of the invention have been described and illustrated in detail herein, the invention is not so limited. Reference should therefore be had to the appended claims in determining the true scope of the invention.

We claim:
1. Apparatus for securing an axle carrying housing to a frame-mounted leaf spring assembly, comprising:
   a plate-like member positioned on the upper surface of the leaf spring assembly and projecting on either side thereof;
   a spacer block positioned below the leaf spring assembly and in alignment with the plate-like member;
   an axle support block having a surface for engaging the axle housing, the lower surface of the spacer block and the upper surface of the axle support block being provided with a plurality of longitudinally spaced interlocking means permitting the axle support block to be shifted in a horizontal direction normal to the axis of the axle and be retained in any of a number of different fixed positions; and
   at least two U-bolts for encircling the axle housing and extending upwardly to and through the plate-like member to clamp the assembly at any of the number of longitudinally spaced positions in relation to the longitudinal axis of the leaf spring assembly.

2. Apparatus according to claim 1 wherein the leaf spring assembly comprises a plurality of leaf springs secured to one another by at least one bolt extending through the springs at their midpoints and projecting thereabove, the plate-like member being provided with longitudinally spaced recessed portions to provide clearance for the ends of the spring securing bolts when the leaf spring assembly and axle housing are in any of said different fixed positions.

3. Apparatus according to claim 1 further including a wedge-shaped block positioned between the spacer block and the axle support block, the upper surface of the wedge-shaped block having interlocking means for mating with the interlocking means of the spacer block and other interlocking means being provided on the adjacent surfaces of said wedge shaped block and said axle support block for varying both the vertical and longitudinal relationship of an axle to the springs.

* * * * *